(12) United States Patent
Broumandan et al.

(10) Patent No.: US 11,002,858 B2
(45) Date of Patent: May 11, 2021

(54) DETECTION OF SPOOFED GNSS SIGNALS USING IMU AND BAROMETER SENSORS

(71) Applicant: UTI LIMITED PARTNERSHIP, Calgary (CA)

(72) Inventors: Ali Broumandan, Calgary (CA); Gérard Lachapelle, Calgary (CA); James T. Curran, County Cork (IE)

(73) Assignee: UTI Limited Partnership, Calgary (CA)

(*) Notice: Subject to any disclaimer, the term of this patent is extended or adjusted under 35 U.S.C. 154(b) by 302 days.

(21) Appl. No.: 16/216,390

(22) Filed: Dec. 11, 2018

(65) Prior Publication Data

US 2019/0179031 A1    Jun. 13, 2019

Related U.S. Application Data

(60) Provisional application No. 62/598,051, filed on Dec. 13, 2017.

(51) Int. Cl.
*G01S 13/58* (2006.01)
*G01S 19/21* (2010.01)
*G01S 19/47* (2010.01)

(52) U.S. Cl.
CPC ............ *G01S 19/215* (2013.01); *G01S 19/47* (2013.01)

(58) Field of Classification Search
CPC ....... B01D 46/0086; F24F 11/30; F24F 11/39; G01N 15/0826; G01N 2015/084; G01S 13/58; G01S 13/87; G01S 13/92; G01S 2007/2883; G01S 2007/4082; G01S 2013/932; G01S 7/04; G01S 7/288; G01S 7/4052

See application file for complete search history.

(56) References Cited

U.S. PATENT DOCUMENTS 7,952,519 B1 * 5/2011 Nielsen ................ G01S 19/215
                                                        342/378
9,507,026 B2   11/2016 Nichols

OTHER PUBLICATIONS

Lo, Sherman, et al. "The Benefit of Low Cost Accelerometers for GNSS Anti-Spoofing." Proceedings of the ION 2017 Pacific PNT Meeting, 2017, Honolulu, HI, USA.

* cited by examiner

*Primary Examiner* — Timothy A Brainard
(74) *Attorney, Agent, or Firm* — Brion Raffoul (57) ABSTRACT

Systems and methods for detecting spoofed or illegitimate GNSS signals. A processor receives GNSS data and processes this data to extract acceleration, angular velocity, and height or altitude variation data. For the same time period, sensor data from IMU (inertial measurement unit) sensors and from a barometer are received by the processor. From the sensor data, the processor extracts similar acceleration, angular velocity, and height variation data. These two sets of data are then correlated and correlation coefficients are calculated. These correlation coefficients are then used to calculate a decision statistic. The decision statistic is compared with a predetermined value and, if the decision statistic is below a predetermined value, then the GNSS data is considered to be illegitimate or spoofed.

21 Claims, 10 Drawing Sheets

DETECTION OF SPOOFED GNSS SIGNALS USING IMU AND BAROMETER SENSORS

RELATED APPLICATIONS

This application is a non-provisional patent application which claims the benefit of U.S. Provisional Application No. 62/598,051 filed on Dec. 13, 2017.

TECHNICAL FIELD

The present invention relates to GNSS (Global Navigation Satellite System)-based navigation. More specifically, the present invention relates to systems and methods for detecting spoofed or illegitimate GNSS signals received by GNSS receivers.

BACKGROUND

The use of GNSS to monitor and regulate vehicular use is widespread. Systems and services such as fleet-management, asset-tracking, pay-as-you-drive insurance use GNSS as the primary, if not the only, positioning sensor. For many of these applications, especially applications where end users are charged or penalized based on their location, there is a strong incentive to compromise on GNSS sensor quality due cost. As expected, when such monitoring devices are installed in vehicles, they are typically enclosed in tamper-proof housings and attached to the vehicle in a manner that either prevents tampering or, if tampering has been done, such tampering is evident. However, it is unavoidable that the GNSS antenna and the device power supply are exposed. In some cases, other vehicle based sensors are also made available to the device via the controller area network (CAN) bus, including, for example, wheel-tick counters and wheel angle. Because the CAN bus offers no authenticity or security features, inputs delivered to the devices are equally vulnerable to spoofing as GNSS is.

Because of the above vulnerabilities, a malicious user may choose to tamper or otherwise interfere with both the GNSS and the vehicle base sensors in an effort to manipulate the estimate of the vehicle's position. Although the tamper-proof enclosure might protect the measurement device itself, any measurements, either RF-based (delivered through an antenna) or digital measurements (delivered through the CAN bus), are exposed.

One should also consider a self-GNSS spoofing scenario where the holder of a vehicle mounted GNSS receiver deliberately shields the antenna from genuine GNSS signals to avoid having the vehicle be tracked by a third party. In addition to shielding the antenna, the GNSS receiver may also introduce counterfeit or illegitimate GNSS signals to cause the receiver to compute incorrect position, velocity and time (PVT) solutions. Detection of such an attack is important as this type of attack is easy to implement and cannot be detected by an unaided single antenna GNSS receiver. Unfortunately, counterfeit or illegitimate signals can be introduced either before the receiver is switched on or before the vehicle leaves a GNSS denied area (e.g. a covered parking lot). When counterfeit or illegitimate signals are introduced in this manner, spoofing detection mechanisms that monitor signal transients, received power variations, or distortions in the received GNSS signals, are likely to be ineffective.

From the above, there is therefore a need for systems and methods which allow for the detection of illegitimate or spoofed GNSS readings.

SUMMARY

The present invention provides systems and methods for detecting spoofed or illegitimate GNSS signals. A processor receives GNSS data and processes this data to extract acceleration, angular velocity, and height variation data. For the same time period, sensor data from IMU (inertial measurement unit) sensors and from a barometer are received by the processor. From the sensor data, the processor extracts similar acceleration, angular velocity, and height variation data. These two sets of data are then correlated and correlation coefficients are calculated. These correlation coefficients are then used to calculate a decision statistic. The decision statistic is compared with a predetermined value and, if the decision statistic is below a predetermined value, then the GNSS data is considered to be illegitimate or spoofed.

In a first aspect, the present invention provides a method for detecting spoofed GNSS signals, the method comprising:
  a) receiving GNSS data from at least one GNSS receiver;
  b) receiving IMU data from at least one IMU sensor;
  c) performing calculations on said GNSS data and on IMU data to thereby project both of said IMU data and said GNSS data on to a common space;
  d) calculating correlation coefficients based on a comparison of results from step c);
  e) calculating a decision metric based on said correlation coefficients;
  f) determining that said GNSS data is spoofed data if the metric is less than a predetermined detection threshold.

In another aspect, the present invention provides a system for detecting illegitimate GNSS signals, the system comprising:
  at least one GNSS receiver receiving GNSS signals, said at least one GNSS receiver producing GNSS data detailing a position of said at least one GNSS receiver;
  at least one IMU sensor for detecting acceleration and angular velocity and producing IMU data detailing said acceleration and angular velocity;
  a barometer for measuring atmospheric pressure and producing pressure data detailing said atmospheric pressure;
  a processor receiving said GNSS data, said IMU data, and said pressure data;
  wherein said processor is configured to execute a method comprising:
  a) receiving said GNSS data from said at least one GNSS receiver;
  b) receiving said IMU data from said at least one IMU sensor;
  c) receiving pressure data from said barometer;
  d) performing calculations on said GNSS data, said IMU data, and said pressure data to thereby project said IMU data, said pressure data, and said GNSS data on to a common space;
  e) calculating correlation coefficients based on a comparison of results from step d);
  f) calculating a decision metric based on said correlation coefficients;
  g) determining that said GNSS data is spoofed data if the metric is less than a predetermined detection threshold.

In yet another aspect, the present invention provides computer readable media having encoded thereon computer readable and computer executable instructions which, when executed by a data processor, implements a method for detecting spoofed GNSS signals, the method comprising:
  a) receiving GNSS data from at least one GNSS receiver;

b) receiving IMU data from at least one IMU sensor;
c) performing calculations on said GNSS data and on IMU data to thereby project both of said IMU data and said GNSS data on to a common space;
d) calculating correlation coefficients based on a comparison of results from step c);
e) calculating a decision metric based on said correlation coefficients;
f) determining that said GNSS data is spoofed data if the metric is less than a predetermined detection threshold.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In one aspect, the present invention uses uncalibrated IMU (inertial measurement unit) sensors to detect spoofing based on a coherency test between GNSS and self-contained sensor measurements. As will be seen, results of actual vehicular dynamics suggest that reasonable spoofing detection accuracy can be achieved with rapid time-to-alarm. The spoofing detection test statistics can be measured and saved in memory in a tamper proof device. In other implementations, either the raw sensor measurements or test statistics can be sent to a central processing unit for further processing and analysis. The consistency between GNSS derived data and IMU derived data can be measured using, for example, the norms of the acceleration vectors and rotation rate vectors.

It should be clear that measurements drawn from these IMU sensors are compared to GNSS-derived measurements to provide consistency checks that could be used to assert whether the GNSS is spoofed or not. In addition to the IMU sensors, a barometer can be used to determine the vehicular altitude. While such a sensor is ideally calibrated, variations in atmosphere pressure can be used to monitor the variations in a vehicle's altitude without needing barometer calibration for absolute height or altitude.

It should also be clear that typical low-cost inertial sensors exhibit high measurement noise and high measurement bias uncertainties and that these uncertainties may require calibration of the sensors. Typically, such calibration is dependent on combining GNSS measurements with IMU-based measurements. This GNSS dependence can be avoided by using a transformation that allows IMU measurements to be compared with GNSS measurements such that the comparison is insensitive to both the initial IMU orientation and any IMU measurement biases.

Figure 1:
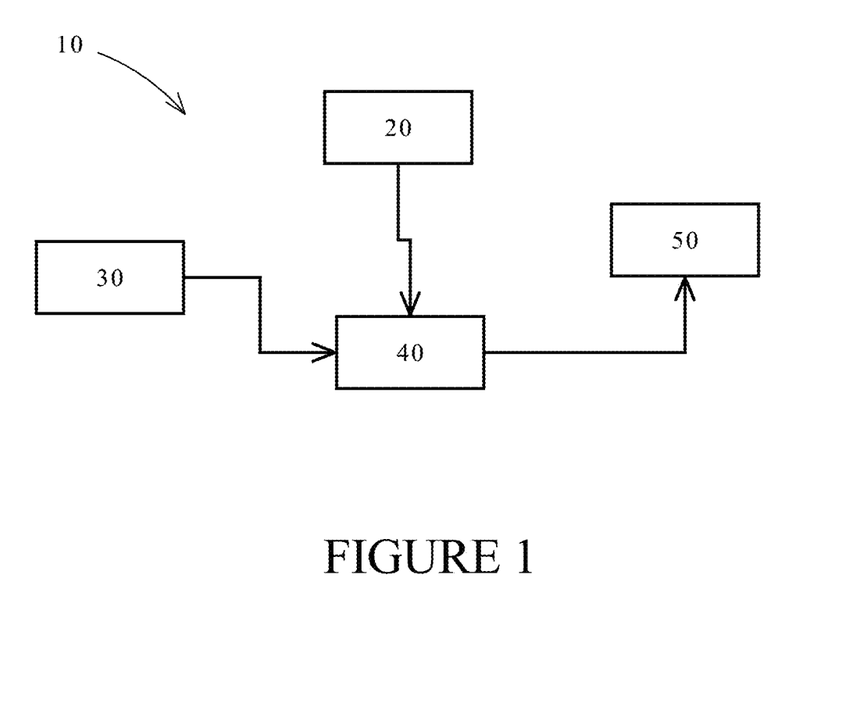
FIG. 1 is a block diagram illustrating a system according to one aspect of the invention.

Referring to FIG. 1, a system according to one aspect of the invention is illustrated. The system 10 has a GNSS receiver 20, IMU sensors 30, a processor 40, and storage 50. As can be seen, the GNSS receiver 20 would receive GNSS signals and the GNSS data generated by the receiver 20 is transmitted to the processor 40. Similarly, the IMU sensors 30 generate sensor data that is also transmitted to the processor 40. Once the processor 40 receives the GNSS data, acceleration, angular velocity, and height variation data are derived and/or calculated from this GNSS data. The derived data is saved in the storage 50 as needed. Consistency between the GNSS derived data and the sensor data is then determined by calculating correlation coefficients that show how much or how little correlation there is between the two sets of data. For clarity, a barometer may be used with the present invention to provide atmospheric pressure readings. Such atmospheric pressure readings can be used to determine changes in the system's altitude. The IMU may consist of a 3-axis accelerometer and/or a gyroscope.

It should be clear that the IMU data to be used to compare with GNSS data includes, in one implementation, acceleration, angular velocity, and altitude change measurements. Since the GNSS data may be a series of positions and velocities of the GNSS receiver and since these GNSS readings are not directly comparable with the IMU data, the GNSS data is processed to result in derived data comparable with the IMU sensor data. It should further be clear that the term "IMU data" includes data gathered from the barometer as noted above.

To perform the above noted comparison between the GNSS data and the IMU sensor data, it is necessary to project the measurements onto a common space. In this case, the GNSS measurements (or the GNSS data) are projected onto equivalent acceleration, angular velocity and rate of change of vertical displacement (or altitude) measurements. To avoid the need to estimate orientation, and under the assumption that the vehicle's orientation does not change rapidly, a high-pass filter is applied to the acceleration vector to reject the bias and gravity contribution as $$A_{IMU} = \|\alpha_{IMU} * h_{HP}\|$$

where $\alpha_{IMU}$ denotes the 3D IMU acceleration and angular velocity vectors and $h_{Hp}$ denotes the impulse response of a second-order high-pass Butterworth filter with a cut-off frequency of 0.01 Hz The GNSS based acceleration is found by taking the second difference of the East, North, Up frame (ENU) position estimates as $$A_{GNSS} = \|\Delta_{P_{ENU}}^2\| F_s^2$$

where $P_{ENU}$ denotes the ENU GNSS based position estimate, AGNSS denotes the 3D GNSS based acceleration estimate, $\Delta^n$ denotes the $n^{th}$ difference of the time-series and $F_S$ denotes the GNSS measurement rate. And, if Doppler-based GNSS velocity is available, $A_{GNSS}$ can be calculated as $$A_{GNSS} = \|\Delta_{v_{ENU}}\| F_s$$

where $v_{ENU}$ denotes the ENU GNSS based velocity estimate.

The GNSS based angular velocity is computed in a similar manner. In case the Doppler-based velocity is not available, the GNSS based position is transformed into east and north up (ENU) coordinates relative to the first GNSS position in each observation window, and the instantaneous velocity is computed as $$v_{GNSS}^E = \Delta p_E F_s$$

$$v_{GNSS}^N = \Delta p_N F_s$$

otherwise the $V_{GNSS}^E$ and $V_{GNSS}^N$ can be directly used from the navigation solutions.

GNSS-based heading can be calculated as $$H_{GNSS} = \tan^{-1}\left(\frac{v_{GNSS}^E}{v_{GNSS}^N}\right)$$

where $H_{GNSS}$ is GNSS based heading information. From this heading measurement, a GNSS based estimate of the angular velocity in the horizontal plane can be computed via $$\omega_{GNSS}=[0 \; 0 \; \Delta H_{GNSS} F_s]$$

with a magnitude denoted by $W_{GNSS}=\|\omega_{GNSS}\|$. Finally, the norm of the IMU based angular velocities measurements is computed as:

$$W_{IMU}=\|\omega_{IMU}\|$$

The comparison between the pairs of time series was made by examining the correlation coefficients, defined as the ratio of the sample covariance of the two-time series to the product of their sample standard deviations, and is given by $$C(x, y) = \frac{\langle(x-\langle x\rangle)(y-\langle y\rangle)\rangle}{\sqrt{\langle(x-\langle x\rangle)\rangle^2 \langle(y-\langle y\rangle)\rangle^2}}$$

where $\langle x \rangle$ denotes the sample average of x. The correlation coefficients for the two datasets are computed as $$\rho_\alpha = C(A_{GNSS}, A_{IMU})$$

$$\rho_\omega = C(W_{GNSS}, W_{IMU})$$

In the case of a barometer, the variation of height or altitude of GNSS position in ENU coordinates is correlated with the variation of height or altitude calculated from the barometer as:

$$\rho_h = C(\Delta_{GNSS}^h, \Delta_{Baro}^h)$$

$\Delta_{GNSS}^h$ is the GNSS height difference in ENU coordinate and $\Delta_{Baro}^h$ is the rate of barometer measurements translated to the height or altitude measurement.

The final decision statistic computed as the weighted sum of the three correlation coefficients as $$\rho = w_1 \rho_\alpha + w_2 \beta_\omega + w_3 \rho_h$$

where $w_i$ is a weighting coefficient.

It should be clear that once the three correlation coefficients have been computed, the decision statistic or metric may be used to determine if the received GNSS data (upon which the correlation coefficients were based) is legitimate or illegitimate (i.e. spoofed). The decision metric can be compared against a stored or predetermined value and, in the event the calculated decision metric is higher or lower than the stored value, the conclusion as to the legitimacy or illegitimacy of the GNSS data (and hence the GNSS signals) can be made.

It should also be clear that the weighting coefficients to be used in the calculation of the decision metric can be determined using experimental data and may be implementation and/or circumstances dependent. In some implementations, the weighting coefficients were positive values which summed to unity. These weighting coefficients may adaptively vary based on the effectiveness of the sensors (e.g. the accelerometer, the gyroscope, and the barometer). Some experiments have shown that, while equal weighting can be effective, different configurations may require different weighting coefficients.

Regarding assumptions made for the above system, it is assumed that the sensors are not installed in any specific orientation relative to the vehicle body frame and that the orientation might be manipulated by the user. Low-cost IMUs that exhibit high bias and scale-factor uncertainties are also assumed. In addition to these assumptions, no attempt was made to calibrate devices using GNSS-derived information. This determination was made to strictly preserve the independence of the IMU and barometer sensors, ensuring that a malicious user cannot influence the detection performance either (i) by physically manipulating the orientation of the IMU or (ii) by attempting to manipulate the calibration coefficients through spoofed GNSS signals. The sensors are therefore used in a manner independent of each other and independent of the GNSS receiver. As such, the IMUs are not used as navigation sensors, but rather as dedicated spoofing detection sensors. The data generated by the IMUs operate as a form of consistency check on the GNSS data.

Under the assumption that the system of the present invention is installed in a vehicle and is only checked periodically for evidence of tampering, the present invention makes no unnecessary assumption regarding the system installation or calibration. No assumptions about the system orientation or the accelerometer or gyroscope biases are made and the detection of spoofing is based on an examination of the consistency between the data generated by the IMU sensors and the GNSS receiver.

To gather data, a data collection campaign was conducted wherein data was collected each day over a period of 30 days. GNSS and IMU data was collected with an iPhone SE, which uses a Qualcomm WTR1605 RF Transceiver and an InvenSense EMS-A 6-axis Gyroscope and Accelerometer IMU. Data was collected during a 12-km vehicular commute including urban, suburban and motorway conditions. The GNSS data collected included GPS and GLONASS measurements. It should be clear that the data collection testbed for this scenario (i.e. the mobile handset) does not provide barometer measurements and, as such, only IMU data was used. The GNSS measurements were recorded at a rate of 1 Hz and the IMU data measurements were recorded at a rate of 10 Hz. Both sets of data were logged for post-processing. Each journey lasted approximately 20 minutes and included speeds ranging from 30 to 110 km/hr. Up-sampling the GNSS data to 10 Hz was carried out such that each dataset consisted of a 9-dimensional time-series, namely latitude, longitude, altitude, 3D acceleration and 3D angular velocity. In the testing scenarios, the spoofed case was emulated by pairing a series of genuine GNSS data measurements with a series of IMU data measurements from a different journey. The main goal was to determine the correlation coefficient between IMU and GNSS measurements in the authentic case to thereby determine a proper detection threshold.

Data collection was performed while traversing a variety of locales. In one experiment, data collection began in a residential locale, traversed a suburban environment, followed by approximately 4 km of motorway, and finally finished in a suburban region.

The principle of operation of the detection mechanism is that there should exist a reasonable correlation between the norm of the acceleration as computed from GNSS positions and velocities and that measured directly by the IMU and, similarly, there should exist a correlation between the norm of the GNSS derived angular velocity and that measured by the IMU. If the GNSS receiver is receiving illegitimate signals (i.e. the GNSS receiver is experiencing spoofing), this correlation will not be present.

During the test the rate of change of GNSS heading, $W_{GNSS}$, was compared with $W_{IMU}$ for consistency checking. A representative example of the norm of the acceleration and angular velocity computed from GNSS measurements and from the IMU measurements is shown in FIGS. 3A-3C for the 20-minute trajectory.

Figure 3A:
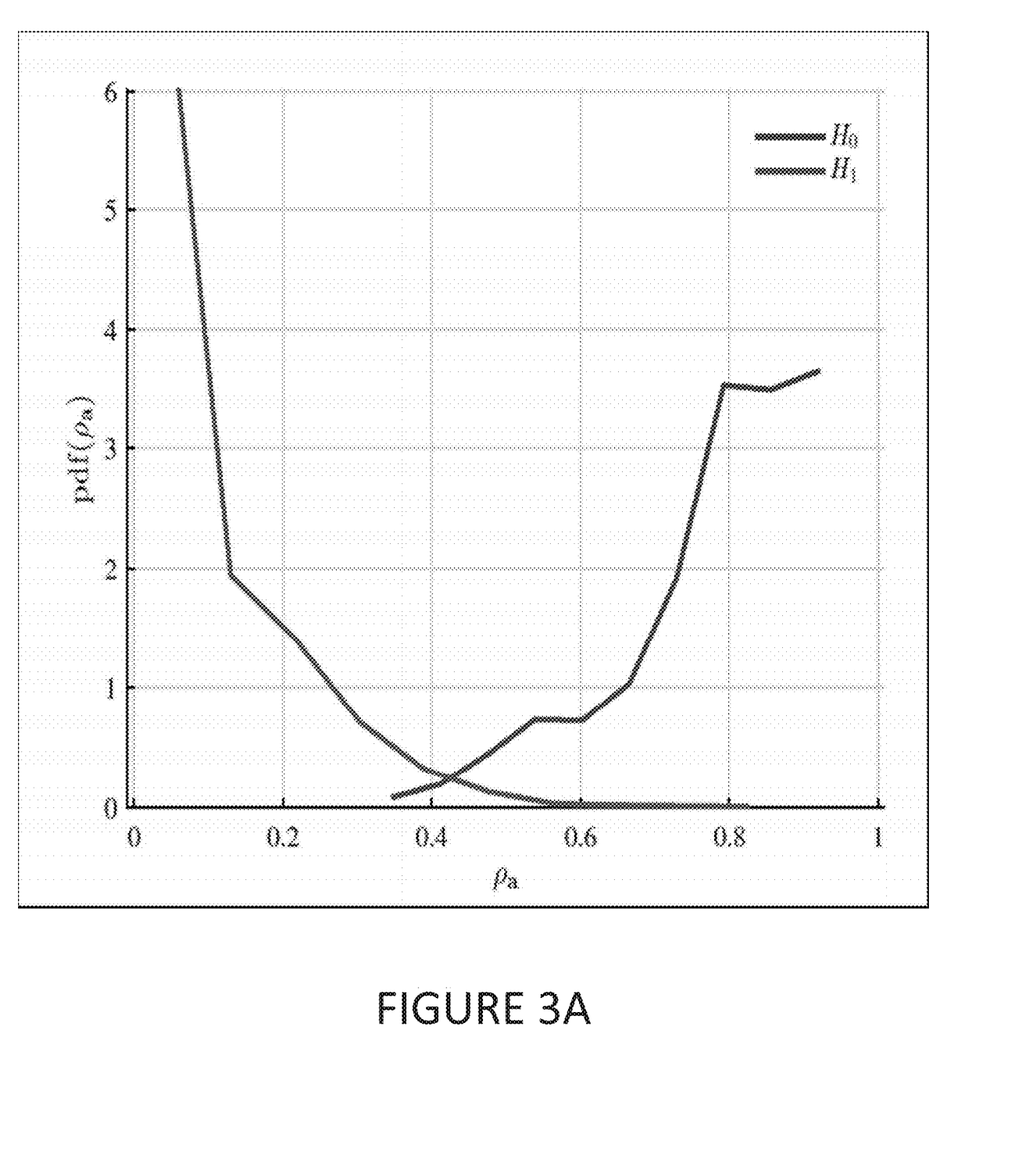
FIGS. 3A-3C are probability density plots for correlation coefficients and decision metrics for spoofed and non-spoofed cases.
Figure 3B:
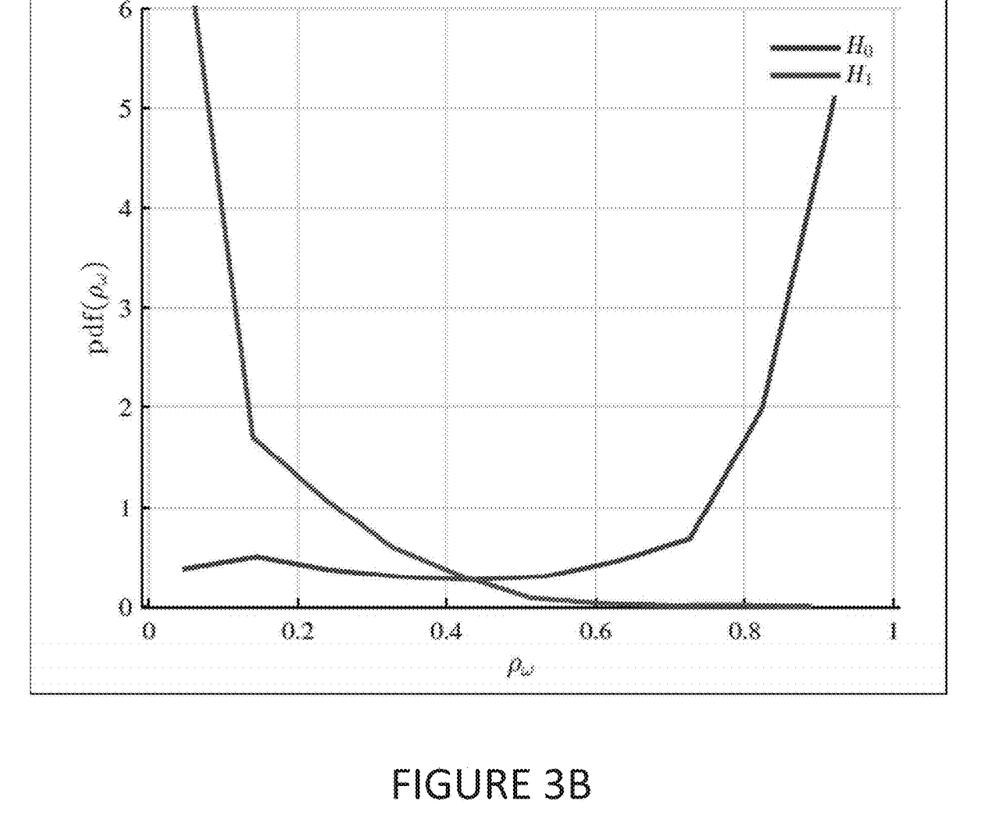
Figure 3C:
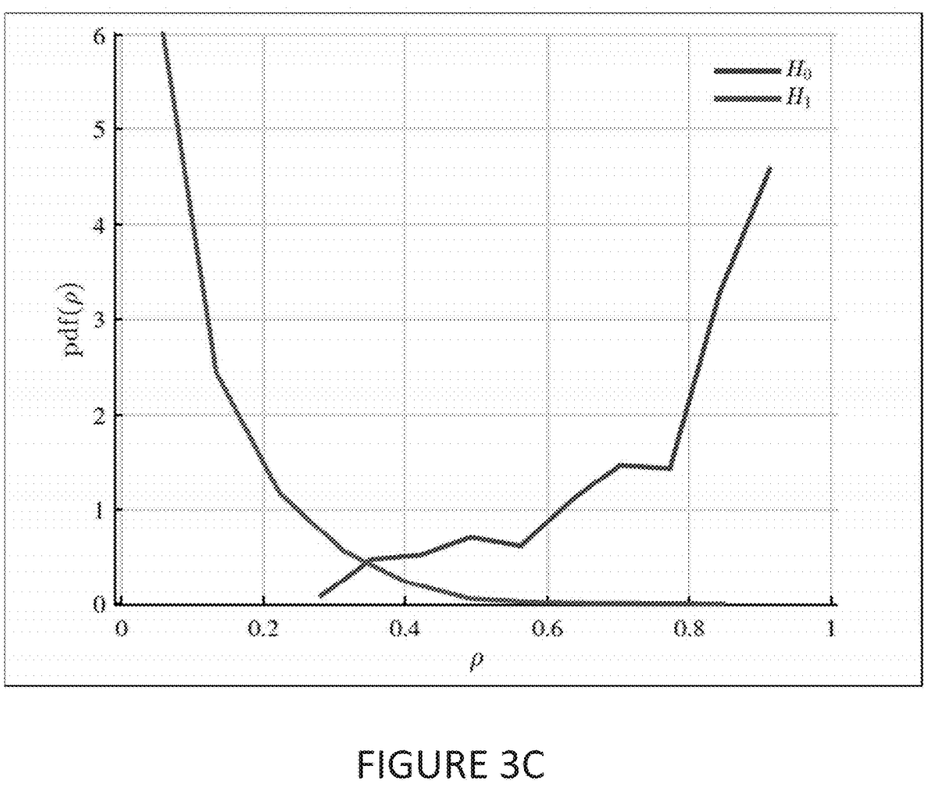

FIG. 3A shows the vehicle's speed while FIG. 3B shows the acceleration norm for both the GNSS derived data and the IMU derived data. FIG. 3C shows the norm of the angular velocity for both the GNSS derived data and the IMU derived data.

Figure 2A:
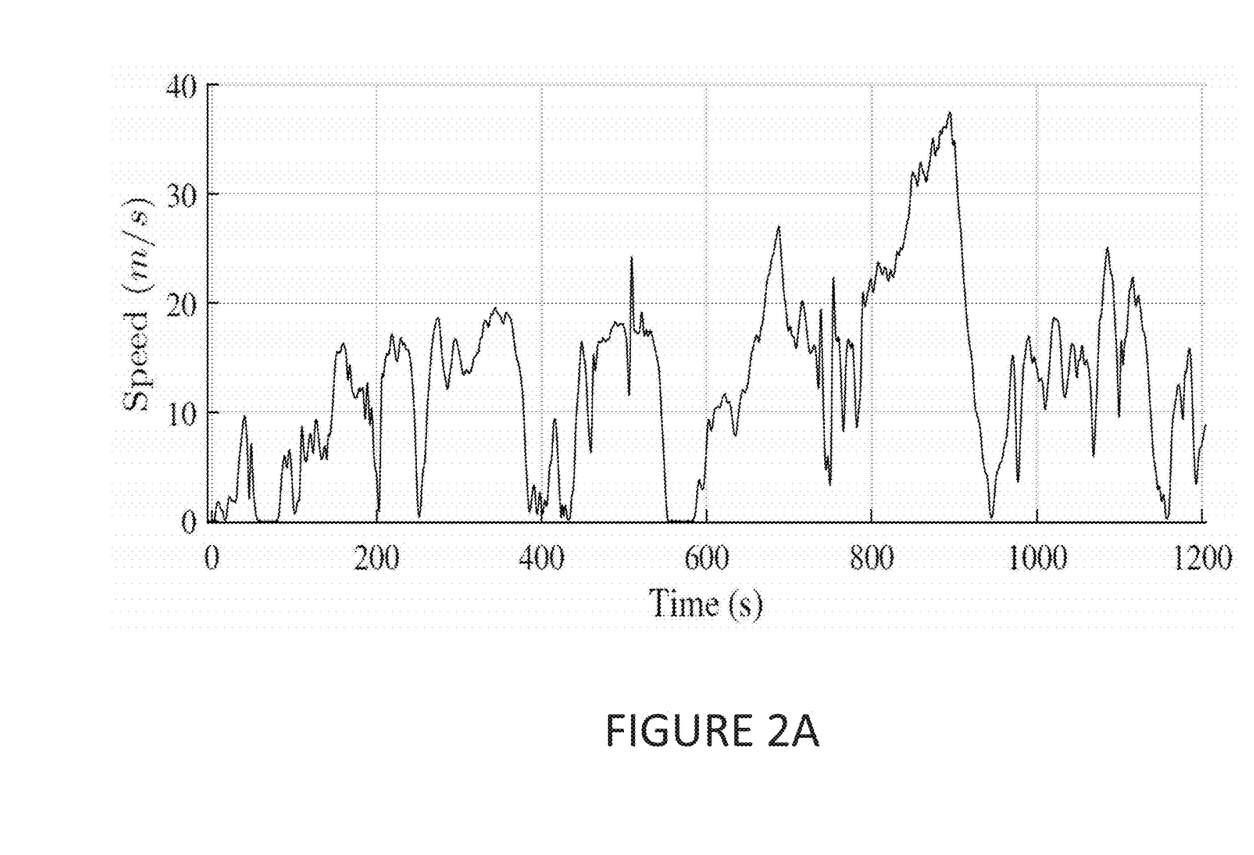
FIGS. 2A-2C illustrate plots of IMU and GNSS data used in one aspect of the present invention.
Figure 2B:
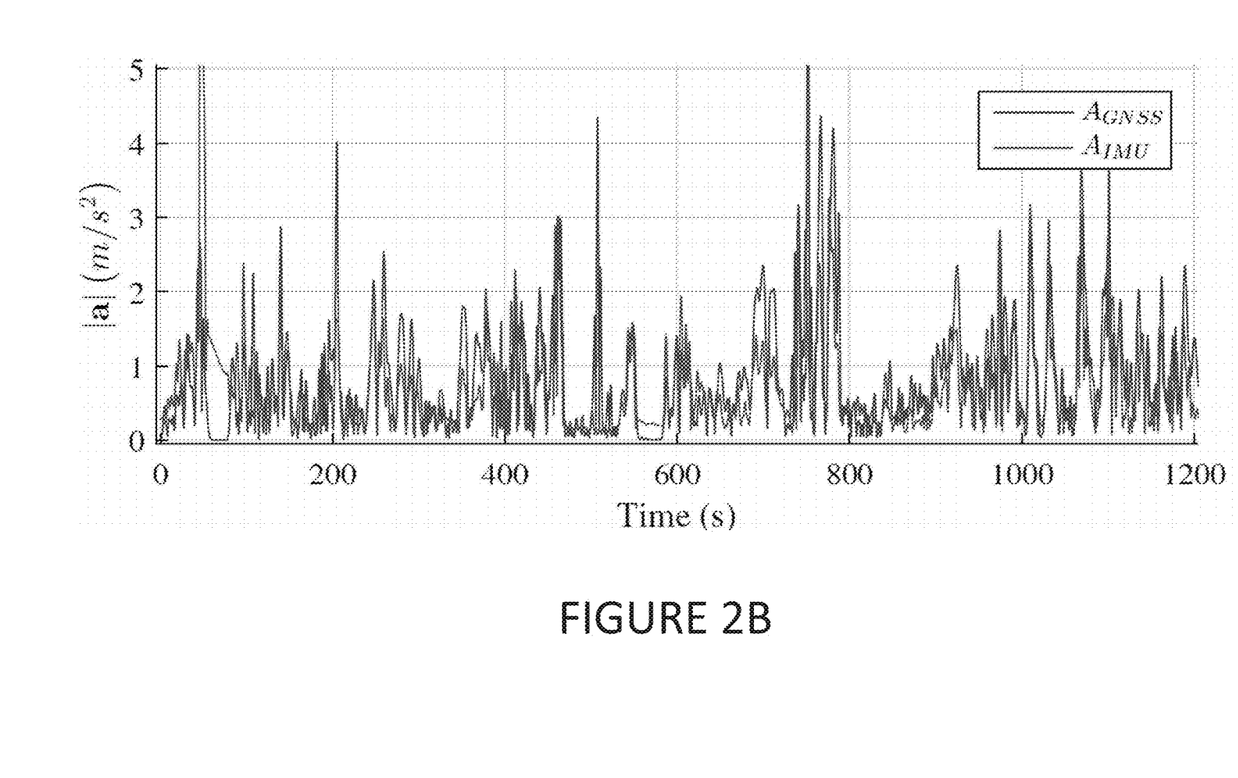
Figure 2C:
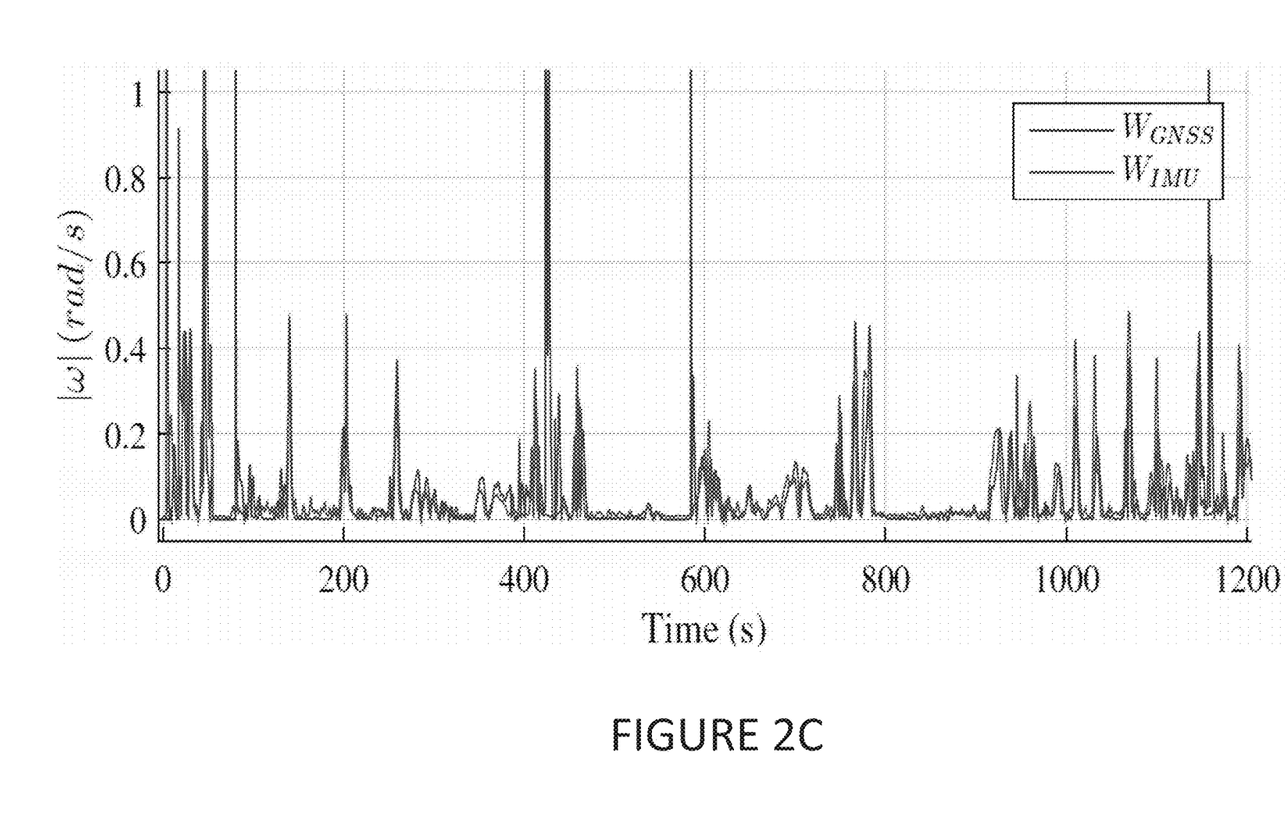

As can be seen from FIGS. 2A-2C, a clear correlation is evident for periods where the vehicle undergoes some dynamics. However, during periods of constant velocity (in particular during periods where the vehicle is stationary), too few features are present to provide any measurable correlation and the noise present on the IMU and GNSS are uncorrelated.

Regarding the decision metric, experiments on the datasets were conducted to determine the decision metric's ability to detect spoofing. The correlation between the GNSS and IMU measurements were examined on short samples of data randomly drawn from the datasets. In half of the cases, the GNSS and IMU data were extracted from the same dataset, such that the GNSS and IMU data were consistent. These cases were assigned to be the 'non-spoofed' hypothesis, and were denoted as $H_0$ in the following plots. In the other half of the cases, the GNSS and IMU data were respectively drawn from different datasets and, as a result, the GNSS and IMU were not coherent. These cases were assigned to be the 'spoofed' case and are denoted as $H_1$ in the following plots. Even in the case that all time-series corresponded to the exact same trajectory, instance-to-instance differences due to traffic and other random influences were expected to result in some decorrelation.

A total of 10,000 samples were drawn and the probability density functions of each of the two correlation coefficients, $\rho_\alpha$ and $\rho_\omega$, under each hypothesis were computed. Examples of these measurements, considering an observation period of $\tau=180$ seconds, are shown in FIGS. 3A-3C. As can be seen from the Figures, both coefficients offer a reasonable separation between the two hypotheses, although it appears that the acceleration based metric is more specific. It is likely that this is a result of the poor quality of the velocity estimate used in the heading determination, which is based on the first difference of 1 Hz GNSS based position estimates. A higher rate position estimate, or the use of a Doppler based velocity estimation, would likely improve this. Nonetheless, both metrics exhibit a high likelihood of decorrelation under $H_1$.

The weighted sum of these two coefficients was then computed for a variety of different weighting coefficients ranging from $\kappa=0.1$ which was predominantly an acceleration measurement, to $\kappa=0.9$ which was predominantly a rotation rate measurement. The probability density function of the combined correlation coefficient is shown in FIG. 3C for $\kappa=0.75$. From inspection, it can be seen that the separation of the $H_0$ and $H_1$ curves is marginally improved with respect to the two individual coefficients of FIGS. 3A and 3B.

For clarity, FIG. 3A shows the probability density of the acceleration decision statistics while FIG. 3B shows the probability density of the angular velocity decision statistics. FIG. 3C shows the probability of the combined decision statistics. It should be noted that the plot in FIG. 3C is that of the weighted sum of the two correlation coefficients used in FIGS. 3A and 3B. As well, it should be noted that the observation period for FIGS. 3A-3C is that of $\tau=180$ seconds. As noted above, combining the decision statistics for acceleration and angular velocity provides a slightly larger difference between the spoofed and non-spoofed cases when compared to the decision statistics for acceleration or angular velocity by themselves.

To test the spoofing detection performance of one aspect of the present invention, a total of 100,000 samples were drawn from the recorded datasets and the combined decision statistic, $\rho$, was computed. This was then compared to a threshold to compute the receiver-operating-characteristic (ROC). A range of weighting coefficients was examined, ranging from $\kappa=0.1$ to 0.9. Two different observation periods were examined, the different periods being $\tau=120$ seconds and $\tau=180$ seconds.

Figure 4A:
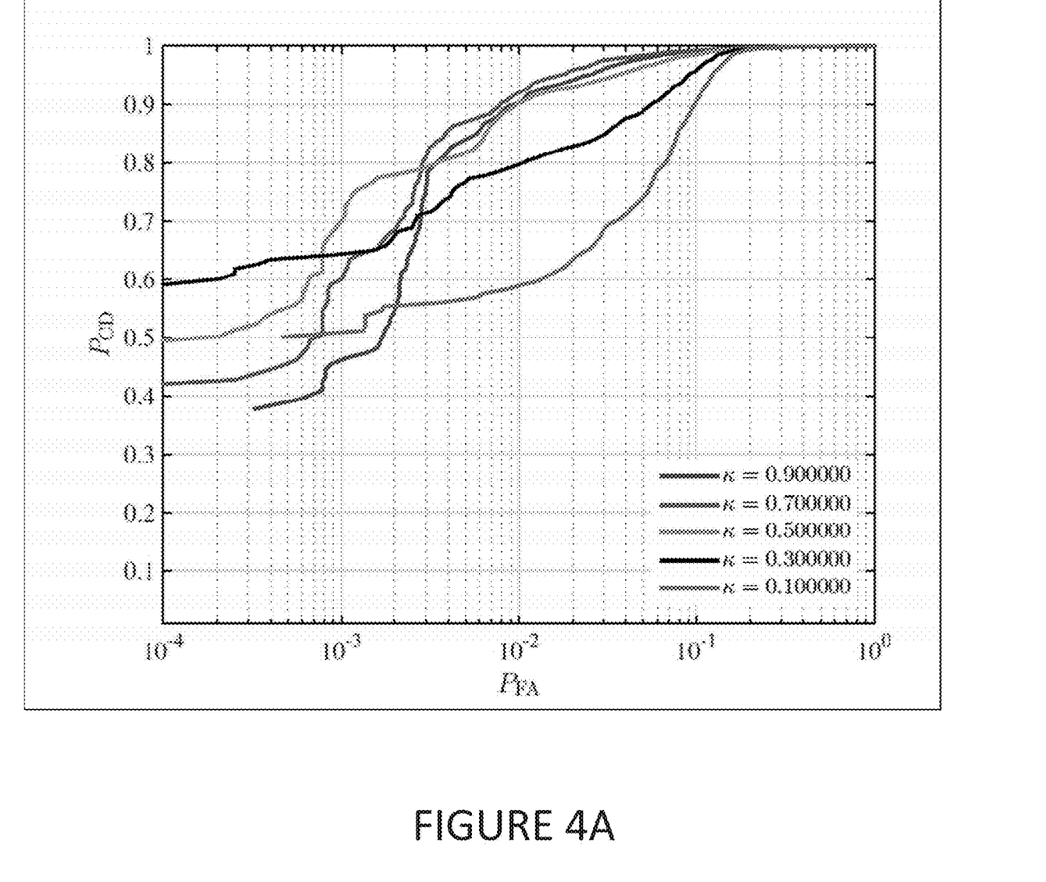
FIGS. 4A and 4B are receiver operating characteristic curves for combined decision metrics using a variety of weighting factors and for different observation periods.
Figure 4B:
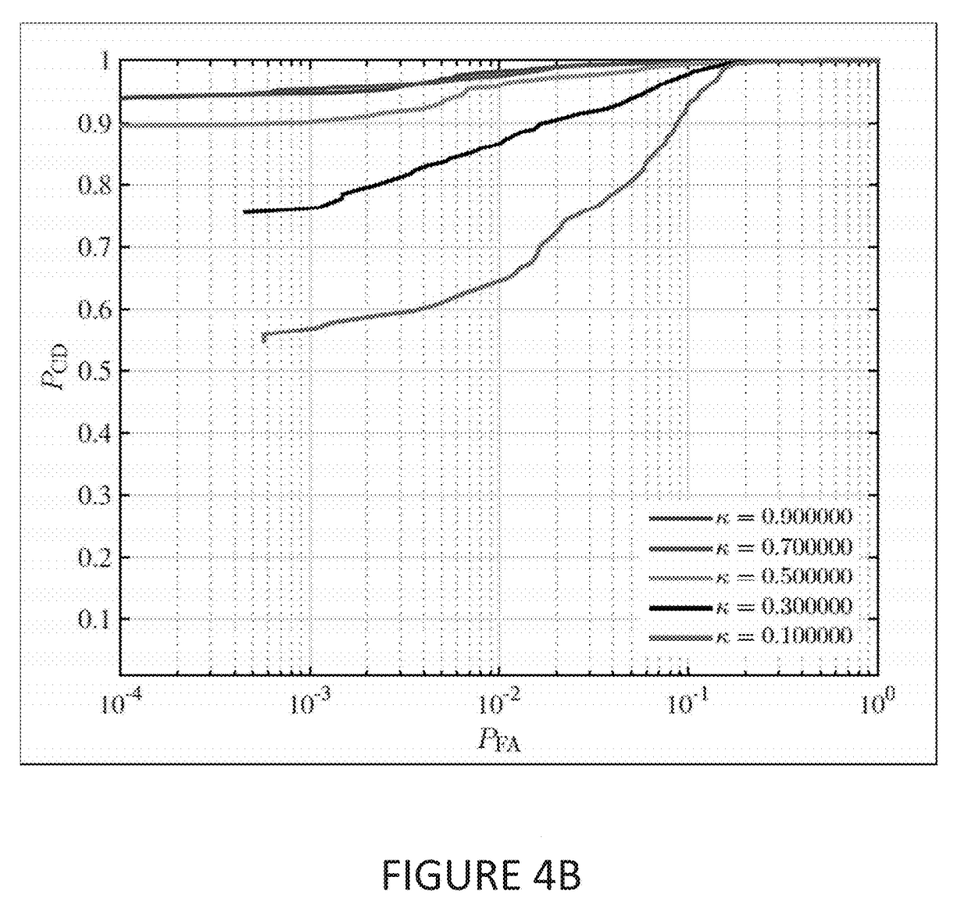

The computed ROC curves are shown in FIGS. 4A-4B. FIG. 4A shows the ROC curve for an observation period of 120 sec while FIG. 4B shows the ROC curve for an observation period of 180 sec. It can be seen that only moderate performance can be achieved for short observation periods. For example, a spoofing detection probability of approximately 0.6, with a false-alarm probability below $10^{-3}$ can be achieved with a time-to-alarm of 120 seconds. However, the detection performance can be significantly improved by tolerating a higher time-to-alarm of 180 seconds. For example, a detection rate of 0.95 and a false-alarm rate of $10^{-4}$ can be observed in the plot of FIG. 4B.

From the above, it can be seen that monitoring the consistency between GNSS and IMU measurements through, in one implementation, the norms of the acceleration and rotation rate (i.e. angular velocity) vectors can be used to detect GNSS spoofing. Incorporating barometer data in the spoofing detection system may further improve the detection performance in scenarios where there are significant disagreements in GNSS and barometer delta-altitude measurements.

Figure 5:
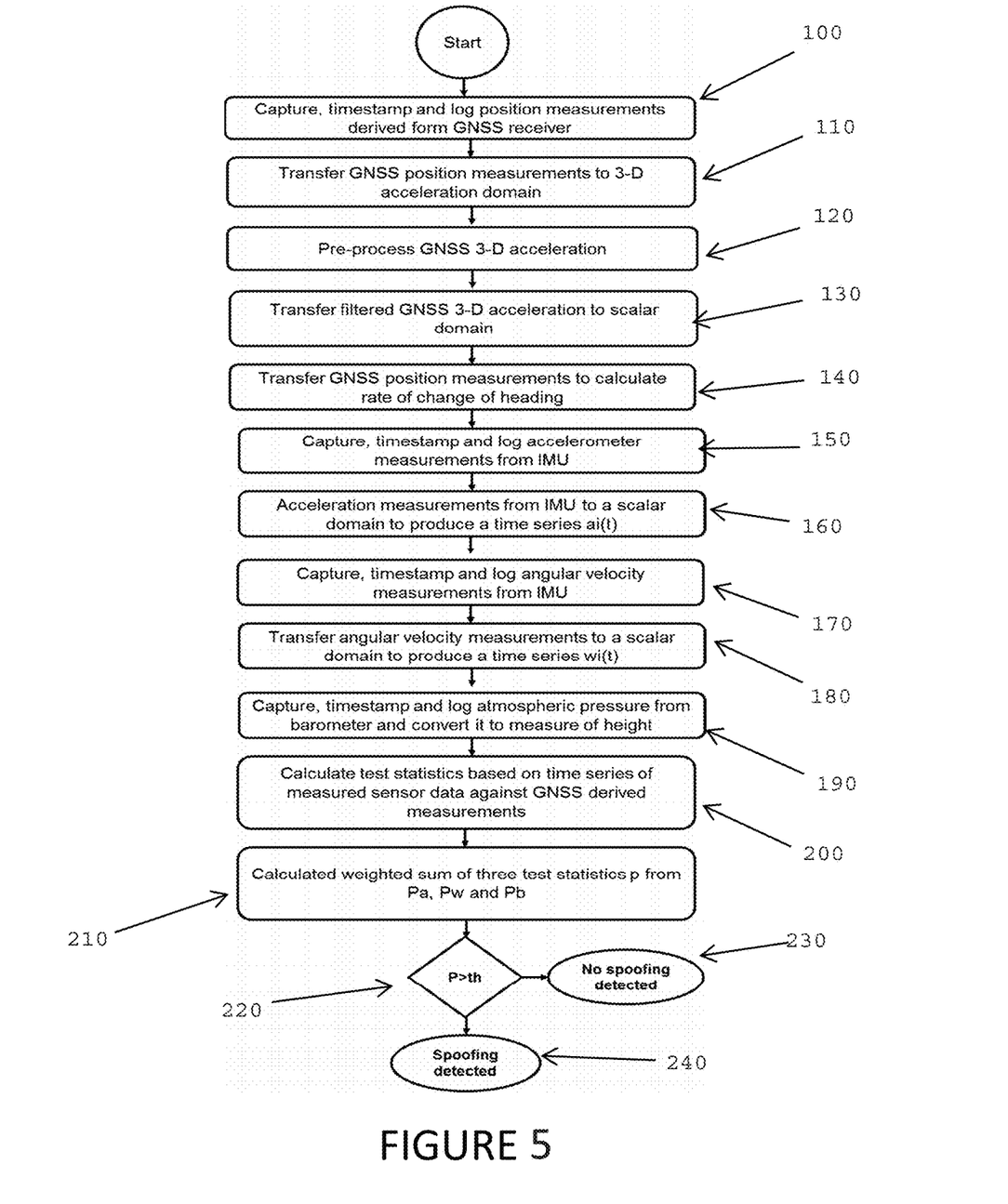
FIG. 5 is a flowchart for a method according to another aspect of the present invention.

Referring to FIG. 5, a flowchart of the method according to one aspect of the invention is illustrated. The method starts at step 100 where GNSS receiver data is captured, time-stamped, and logged. As noted above, this data includes GNSS based positions of the receiver. These measurements are then transformed into the 3D acceleration domain (step 110). The resulting 3D acceleration data is then pre-processed (step 120) and then transferred to the scalar domain (step 130). As can be seen, the pre-processing may involve filtering the 3D acceleration data.

After the above, in step 140, the GNSS position or velocity measurements are transferred so that they can be used to calculate the heading rate of change. In step 150, IMU data is gathered as accelerometer measurements from the IMU are captured, time-stamped, and logged. These acceleration measurements from the IMU are then transferred into the scalar domain in step 160 to produce a time series. In step 170, further IMU data is gathered as angular velocity measurements from the IMU are captured, time stamped, and logged. The angular velocity measurements from the IMU are then transferred into the scalar domain to produce its own time series (step 180). Readings from the barometer are then captured, time-stamped, and logged in step 190. The time series captured in the above steps are then used to calculate correlation coefficients between the GNSS derived data and the IMU derived data (step 200). The weighted sum of these correlation coefficients is then calculated in step 210. In comparison 220, the resulting weighted sum is compared against a predetermined threshold value. If the weighted sum is greater than the threshold, then it is concluded in step 230 that the GNSS data is legitimate and that no spoofing has occurred. However, if the weighted sum is determined to be less than the threshold value, then step 240 concludes that the GNSS data is spoofed data.

It should also be noted that while the discussion above highlights a processor that may be co-located with the GNSS receiver and the IMU sensors, there is no requirement for such co-location. The processor may be remote from the GNSS receiver and the IMU sensors with the GNSS data and the IMU data being transmitted to the processor at a different location. As well, the storage where the data may be placed (and where the threshold data for comparison with the correlation metrics and coefficients is stored) may be remote from the processor and/or the GNSS receiver and IMU sensors. The storage may also be placed in a tamper-resistant housing and the data connection between the processor and the storage may also be tamper resistant. Such safeguards may be needed as, similar to the controller area network bus, the data interchange between the processor and storage may be compromised. Such a compromised data interchange might lead to illegitimate or false data being fed to the processor.

Regarding the processor, the processor may be any general purpose data processor capable of the above calculations on the stream of GNSS position readings as well as the IMU acceleration and angular velocity data. The barometer readings, where necessary, are also fed to the processor and are also processed accordingly. Alternatively, the processor may be a dedicated processor designed to perform only a small set of functions with these functions including the above noted calculations for the data transformations and the correlation coefficients. A suitable ASIC (application specific integrated circuit) may also be used in such an implementation.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming languages (e.g. "C") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for detecting spoofed Global Navigation Satellite System (GNSS) signals, the method
   comprising: receiving GNSS signals and further comprising: a) receiving
   b) receiving inertial measurement unit (IMU) data from at least one IMU sensor;
   c) performing calculations on said GNSS data and on IMU data to thereby project both of said IMU data and said GNSS data on to a common space;
   d) calculating correlation coefficients based on a comparison of results from step c);
   e) calculating a decision metric based on said correlation coefficients; and
   f) determining that said GNSS data is spoofed data if the metric is less than a predetermined detection threshold.

2. The method according to claim 1, wherein said GNSS data comprises a plurality of location readings for said GNSS receiver.

3. The method according to claim 2, wherein said calculations on said GNSS data in step c) results in at least one of: acceleration data, angular velocity data, and change of altitude data.

4. The method according to claim 1, further comprising determining an acceleration of said GNSS receiver.

5. The method according to claim 4, wherein said acceleration is derived from typical receiver messages.

6. The method according to claim 5, wherein said typical receiver messages is at least one of: a time series of reported receiver positions, reported receiver velocities data, and reported receiver speed-over-ground data.

7. The method according to claim 4, wherein said acceleration is determined from a time series of reported receiver positions and step c) comprises taking a second difference of east and north up (ENU) position estimates from said GNSS data as $A_{GNSS} = \Delta P_{ENU}^2 F_S^2$ where $P_{ENU}$ denotes ENU GNSS-based position estimates, $A_{GNSS}$ denotes 3D GNSS-based acceleration estimates, $\Delta^n$ denotes an $n^{th}$ difference of a GNSS-derived time-series, $\Delta P_{ENU}^2$ denotes a second difference of said ENU GNSS-based position estimates, and $F_S$ denotes a GNSS measurement rate.

8. The method according to claim 4, wherein said acceleration is determined from reported receiver velocities and step c) comprises taking a first difference of ENU velocity estimates from said GNSS data as $A_{GNSS} \Delta V_{ENU} F_S$ where $V_{ENU}$ denotes ENU GNSS-based velocity estimates, $A_{GNSS}$ denotes 3D GNSS based acceleration estimates, $\Delta V_{ENU}$ denotes a difference of said ENU GNSS-based velocity estimates, and $F_S$ denotes a GNSS measurement rate.

9. The method according to claim 4, wherein said acceleration is determined from receiver speed-over-ground data and step c) comprises taking a first difference of speed estimates from said GNSS data as $A_{GNSS} = \Delta S_{Overground} F_S$ where $S_{Overground}$ denotes speed estimates, $A_{GNSS}$ denotes 3D GNSS based acceleration estimates, $\Delta S_{Overground}$ denotes said first difference of speed estimates, and $F_S$ denotes a GNSS measurement rate.

10. The method according to claim 1, wherein step c) comprises applying a high pass filter to acceleration vector data from said IMU data using $A_{IMU} = \alpha_{IMU} * h_{HP}$ where $A_{IMU}$, denotes IMU-based acceleration estimates, $\alpha_{IMU}$ denotes a 3D IMU acceleration and rate gyro vector and $h_{HP}$ denotes an impulse response of a high-pass filter.

11. The method according to claim 1, wherein step c) comprises estimating the receiver velocity in east and north up (ENU) frame by transforming GNSS based position data into ENU coordinates relative to a first GNSS position in an observation window, and calculating an instantaneous velocity as $v_{GNSS}^E = \Delta P_E F_S$
$v_{GNSS}^N = \Delta P_N F_S$ where $v_{GNSS}^E$ denotes an instantaneous velocity in the east direction, $v_{GNSS}^N$ denotes an instantaneous velocity in the north direction, $\Delta P_E$ denotes a position difference in the east direction, $\Delta P_N$ denotes a position difference in the north direction, and $F_S$, denotes a GNSS measurement rate.

12. The method according to claim 11, wherein GNSS heading data is calculated as $$H_{GNSS} = \tan^{-1}\left(\frac{V_{GNSS}^E}{V_{GNSS}^N}\right)$$

where $H_{GNSS}$ is GNSS-based heading information.

13. The method according to claim 12, wherein GNSS-derived angular velocity is estimated based on said GNSS heading and said GNSS instantaneous velocity such that $\omega_{GNSS} = [0 \ 0 \ \Delta H_{GNSS} F_s]$ with a magnitude denoted by $W_{GNSS} = \omega_{GNSS}$.

14. The method according to claim 1, wherein step c) comprises estimating the receiver velocity in east and north up (ENU) ENU frame by using GNSS receiver Doppler derived velocity measurements.

15. The method according to claim 1, wherein said correlation coefficients are ratios of a sample covariance of IMU and GNSS time-series to a product of their sample standard deviations and said correlation coefficients are calculated by $$C(x, y) = \frac{\langle(x - \langle x \rangle)(y - \langle y \rangle)\rangle}{\sqrt{\langle(x - \langle x \rangle)\rangle^2 \langle(y - \langle y \rangle)\rangle^2}}$$

where x and y are data vectors and $\langle x \rangle$ denotes a sample average of x.

16. The method according to claim 15, wherein a correlation coefficient $\rho_\alpha$ for acceleration and a correlation coefficient $\rho_\omega$, for angular velocity are given by:

$\rho_\alpha = C(A_{GNSS}, A_{IMU})$
$\rho_\omega = C(W_{GNSS}, W_{IMU})$ where $A_{GNSS}$ denotes 3D GNSS-based acceleration estimates, $A_{IMU}$, denotes IMU-based acceleration estimates, $W_{GNSS}$ denotes a magnitude of GNSS-derived angular velocity, and $W_{IMU}$, denotes a magnitude of IMU-derived angular velocity.

17. The method according to claim 15, wherein altitude variations in GNSS positions in east and north up (ENU) ENU coordinates are correlated with variations in atmospheric pressure readings:

$\rho_h = C(\Delta_{GNSS}^h, \Delta_{Baro}^h)$ where $\rho_h$ denotes a correlation coefficient, $\Delta_{GNSS}^h$ is a GNSS-derived altitude difference in ENU coordinates and $\Delta_{Baro}^h$ is an altitude difference derived from a barometer measurement difference.

18. The method according to claim 1, wherein said decision metric is a weighted sum of correlation coefficients for acceleration, angular velocity, and change of altitude for GNSS and IMU derived measurements.

19. The method according to claim 18, wherein said decision metric $\rho$ is computed as a weighted sum of correlation coefficients for acceleration, angular velocity, and change of altitude $\rho = w_1 \rho_\alpha + W_2 \rho_\omega + W_3 \rho_h$ where $w_i$ is a weighting coefficient, $\rho_\alpha$ is a correlation coefficient for acceleration, $\rho_\omega$, is a correlation coefficient for angular velocity, $\rho_h$ is a correlation coefficient for change of altitude, $V_T$ is the predetermined detection threshold and wherein, when $\rho < V_T$, said GNSS data is determined to be said spoofed data.

20. A system for detecting illegitimate Global Navigation Satellite System (GNSS) signals, the system comprising:
at least one GNSS receiver receiving GNSS signals, said at least one GNSS receiver producing GNSS data detailing a position and velocity of said at least one GNSS receiver;
at least one inertial measurement unit (IMU) sensor for detecting acceleration and angular velocity and producing IMU data detailing said acceleration and angular velocity;
a barometer for measuring atmospheric pressure and producing pressure data detailing said atmospheric pressure;
a processor receiving said GNSS data, said IMU data, and said pressure data;
wherein said processor is configured to execute a method comprising:
a) receiving said GNSS data from said at least one GNSS receiver;
b) receiving said IMU data from said at least one IMU sensor;
c) receiving pressure data from said barometer;
d) performing calculations on said GNSS data, said IMU data, and said pressure data to thereby project said IMU data, said pressure data, and said GNSS data on to a common space;

e) calculating correlation coefficients based on a comparison of results from step d);
f) calculating a decision metric based on said correlation coefficients; and
g) determining that said GNSS data is spoofed data if the metric is less than a predetermined detection threshold.

21. Non-transitory computer-readable media having encoded thereon computer: readable and computer: executable instructions that, when executed, implements a method for detecting spoofed Global Navigation Satellite System (GNSS) signals, the method comprising: receiving GNSS signals and further comprising: a) receiving
  b) receiving inertial measurement unit (IMU) data from at least one IMU sensor;
  c) performing calculations on said GNSS data and on IMU data to thereby project both of said IMU data and said GNSS data on to a common space;
  d) calculating correlation coefficients based on a comparison of results from step c);
  e) calculating a decision metric based on said correlation coefficients; and
  f) determining that said GNSS data is spoofed data if the metric is less than a predetermined detection threshold.

\* \* \* \* \*